US007033274B1

(12) United States Patent
Orus et al.

(10) Patent No.: US 7,033,274 B1
(45) **Date of Patent: *Apr. 25, 2006**

(54) PROTECTED SLOT MACHINE

(75) Inventors: Herve Orus, Carnoux (FR); Frederic Foglino, La Ciotat (FR)

(73) Assignee: GEMPLUS, Gemenos Cedex (FR)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/463,804

(22) PCT Filed: Jul. 28, 1998

(86) PCT No.: PCT/FR98/01672

§ 371 (c)(1),
(2), (4) Date: Jul. 17, 2000

(87) PCT Pub. No.: WO99/06973

PCT Pub. Date: Feb. 11, 1999

(30) Foreign Application Priority Data

Jul. 31, 1997 (FR) .................................. 97 09820

(51) Int. Cl.
*A63F 13/00* (2006.01)

(52) U.S. Cl. ............................ 463/29; 463/25; 463/20

(58) Field of Classification Search .................. 463/25, 463/29, 1, 16–20, 24, 36, 40, 42; 273/143 R, 273/138.1; 235/374–382, 435–438; 194/205, 194/213, 214, 202, 239, 240, 353, 342, 350, 194/351; 705/17, 39–41; 454/18, 29; 340/500, 340/501, 540, 323 R, 825, 825.3–825.35
See application file for complete search history.

(56) References Cited

U.S. PATENT DOCUMENTS

| | | | | | |
|---|---|---|---|---|---|
| 3,783,989 | A | * | 1/1974 | Jensen | 194/206 |
| 4,361,754 | A | * | 11/1982 | Hoskinson et al. | 235/381 |
| 5,113,990 | A | * | 5/1992 | Gabrius et al. | 194/206 |
| 5,429,361 | A | * | 7/1995 | Raven et al. | 463/25 |
| 5,467,856 | A | * | 11/1995 | Okada | 273/138 A |
| 5,470,079 | A | * | 11/1995 | LeStrange et al. | 273/138 A |
| 5,559,312 | A | * | 9/1996 | Lucero | 273/138 A |
| 5,635,696 | A | * | 6/1997 | Dabrowski | 194/206 |
| 5,744,787 | A | * | 4/1998 | Teicher | 235/380 |

FOREIGN PATENT DOCUMENTS

| | | |
|---|---|---|
| EP | 0360613 A2 | 3/1990 |
| WO | WO9607164 | 3/1996 |

* cited by examiner

*Primary Examiner*—John M. Hotaling, II
(74) *Attorney, Agent, or Firm*—Buchanan Ingersoll PC

(57) ABSTRACT

A protected slot machine has a token-type cash device and a smart card reader. A central unit manages the games played by token and/or smart card. Improper use by the players is prevented by separating the credits issuing from games by card or by tokens, respectively. As a result credits are given in the form of tokens for a stake or a game played with tokens and, when a game is played with a smart card, credits are applied to a smart card present in the reader before it is ejected or before the insertion of a new card.

27 Claims, 2 Drawing Sheets

PROTECTED SLOT MACHINE

This application is based on French Patent Application No. 97/09820, filed on Jul. 31, 1997, which is incorporated by reference herein.

BACKGROUND

1. Field of the Invention

The invention relates to a slot machine that is protected so as to prevent any improper use by the players of the machine.

It applies to slot machines having both a token cash device (conventionally referred to as a token comparator) and an electronic cash device for payment by means of a smart card, or to slot machines having only an electronic cash device.

2. Background of the Invention

A slot machine equipped with a smart card reader accepts both play with a smart card and play with a token, without distinguishing between these two types of play. This is because, in order to issue a credit from a smart card to a slot machine, the smart card reader faithfully recreates the electronic signals produced by a token when it is inserted in the slot machine. In the same way, in order to credit a smart card from a slot machine, the smart card reader recreates the electronic signals of a token when it is paid by the slot machine.

There are a number of problems to be addressed when a smart card is improperly used for payment or credit during the play of a slot machine. One problem to be resolved consists in preventing stakes presented by a smart card from falsifying the counter of the receipts bank of the slot machine.

A second problem to be addressed consists in preventing a player who is playing with tokens on a machine with a mixed cash device (which accepts both tokens and smart cards) from recovering winnings obtained, or the credit available to him in electronic form, on his smart card.

A third problem to be resolved consists in preventing a player playing with a card on a machine with an electronic cash device from transferring the credit on his card to the slot machine, inserting a new card in the slot machine reader, and requesting the transfer of credit to this new card.

A fourth problem to be addressed consists in preventing a player playing with a card on a machine with an electronic cash device from being able to transfer the credit on his card to the slot machine and recover the winnings in the form of tokens.

SUMMARY OF THE INVENTION

The solution proposed by the invention to resolve these problems is to effect a separation, for each player, of the stakes and winnings made by tokens (or coins) from the stakes and winnings made by smart cards, and to effect a separation of the stakes and winnings made with one smart card from the stakes and winnings made with another smart card.

The present invention is particularly directed to a protected slot machine having a token-type cash device and/or a smart card cash device having a smart card reader-validator, and a central unit for managing the games played by token and/or smart card. In machines of these types, the invention provides means of separating the credits issuing from games that are played by card from games played by tokens, so as to issue credits in the form of tokens for a stake or game undertaken by token. If a game is played by means of a card, the invention issues credits on a smart card present in the reader before it is ejected or before insertion of a new card.

To avoid falsifying the counter of the receipts bank, the means of separating the credits include means for directing, by the smart card reader, the stakes posted by the smart card to the hopper of the slot machine.

To this end, the means for directing the stakes posted by smart card to the hopper includes a connection device for connecting each of the following signals to the smart card reader: the reset output (RESET) of the central unit (CPU) of the slot machine, the CPU token level output of the machine, the input controlling the orientation diverter of the machine, and the hopper token level output of the machine.

According to another feature of the invention, the credit separation means include means for detecting, by the smart card reader, information on the games undertaken, on the stakes and on the credit available for a player as soon as a smart card is inserted in the reader, and until the smart card is ejected.

Slot machines have at least one stake counter and a game counter connected to their central management unit. According to the invention provision is made for detecting whether a partial stake has been posted to the machine. To this end the detection means includes a device for connecting the output signals from these counters to the smart card reader upon insertion of a smart card in the reader or upon a request to eject the card from the reader.

The central management unit for the machine is able to deliver as an output a signal inhibiting the cash device/token comparator. According to the invention the detection means also includes a device for connecting the reader to this output in order to direct the signal inhibiting the cash device/token comparator to the smart card reader upon the insertion of a new card or when there is a request to eject the smart card.

The protected slot machines have a credit counter, and a device indicating a minimum stake in this credit counter is able to supply a signal indicating this stake. The detection means includes a device for connection to the credit indicator device in order to direct the signal delivered by this device to the smart card reader upon insertion of a new card or when there is a request to eject the card.

The means of separating the credits which have just been described are based on parallel connections of certain inputs and/or outputs of the electronics of the gaming machine to the smart card reader.

According to another embodiment, provision is made for effecting the separation of the credits by replacing the parallel connection devices with a serial connection. In this embodiment, the information relating to the different inputs and/or outputs are exchanged according to the serial communication protocol of the link. This exchange is controlled by a program loaded for this purpose in the program memory of the electronics of the machine.

BRIEF DESCRIPTION OF THE FIGURES

The invention will be more clearly understood from a reading of the description which follows, with reference to a non-limitative example illustrated in the drawings, in which.

DETAILED DESCRIPTION

Figure 1:
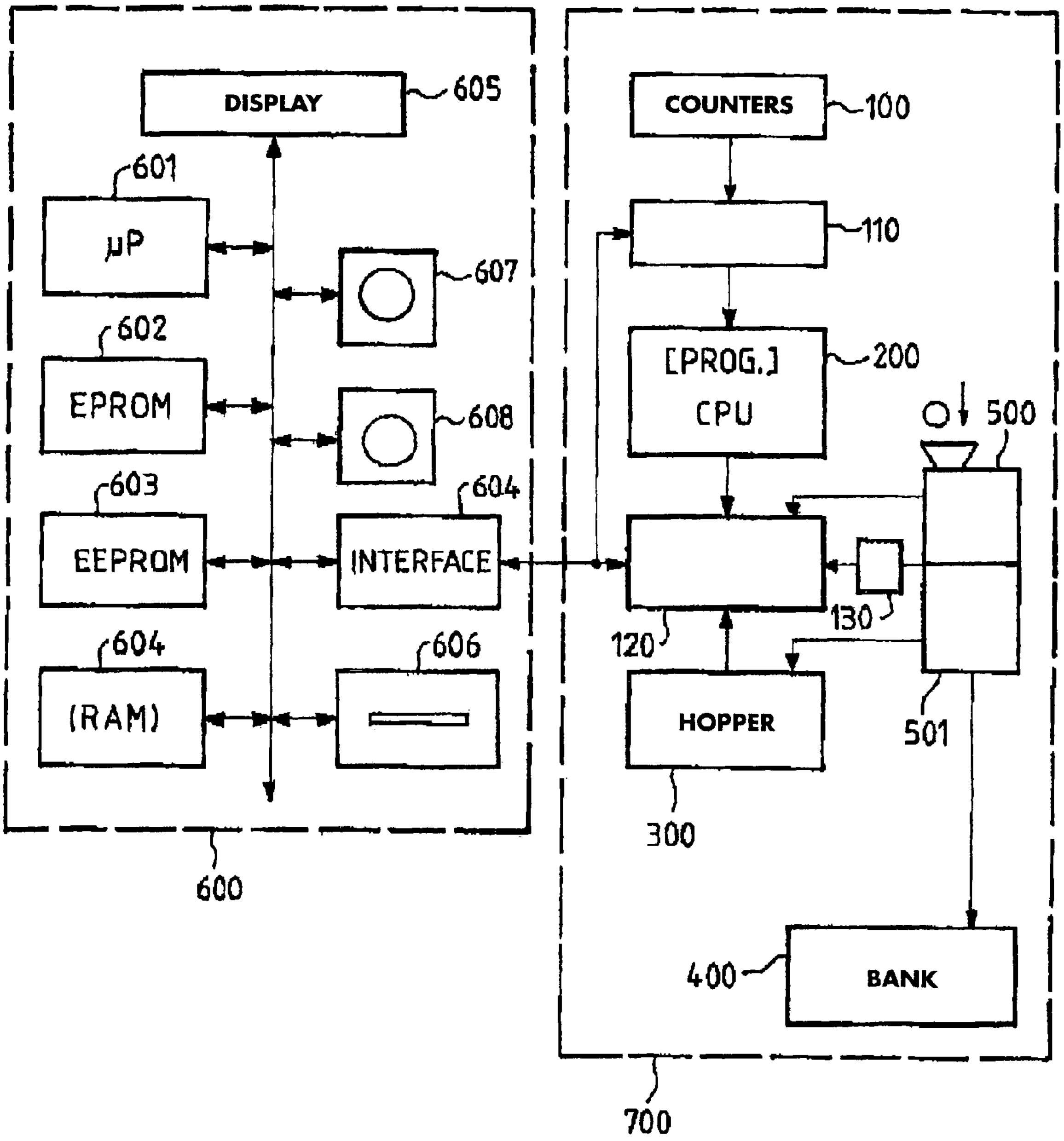
FIG. 1 depicts a general diagram of a slot machine with a token cash device and an electronic cash device, and having a protective device according to the invention.

A card-type cash device 600, also referred to as a reader-validator, a simplified diagram of which is depicted in FIG. 1, has a structure equivalent to that of well-known smart card readers. It comprises, inside a housing 600, a microcontroller 601 which manages all the operations relating to an application, loaded in the form of a program in a non-volatile memory (for example in EPROM memory 602). For this purpose this microcontroller is connected, by a program memory bus, to a second memory 603 of the EEPROM type, the latter making it possible for example to store a certain number of parameters which change only a little, prohibition lists (for example for reproducible cards). The microcontroller is also connected to a third memory 604 of the RAM type serving as a random access memory for executing the program of the microcontroller.

The microcontroller can possibly be connected to an RTC (Real Time Clock) circuit and to a security module which comprises a DES or RSA diversification algorithm for ensuring security in the exchanges between the reader and other components external to the reader.

The bus is also connected to a display 605 which displays in particular the sums played and the winnings obtained. The reader validator has an input 606 intended to receive the card of the player and possibly cards intended for the staff in order to act, for example, on the parameters of the payment system (notably the value of the stakes associated with the minimum and maximum stake buttons).

The bus is also connected to a certain number of control buttons, here two buttons 607 and 608, which enable the players to stake the minimum stake provided for or the maximum stake. Another button, not shown, initiates the game. Finally, there is in the cash device a logic interface 604 intended to provide the exchanges between the reader and the electronics 700 of the slot machine.

The interface 604 decodes the instructions appearing on the bus and intended for the electronics 700 of the gaming machine, and conversely to decode the signals issuing from these electronics in order to be analysed by the reader. The physical interface intended to provide the connections in accordance with the invention between the electronics of the gaming machine and the reader is in the form of connectors 110 and 120 having a set of pins connected to the inputs and/or outputs of the elements specified below.

Before going into more detail about the invention, it should be stated that a casino slot machine has five counters in France (six counters in other countries: USA, etc):

- a total counter for the stakes C1: totals the number of tokens staked
- a total counter for the outputs C2: totals the number of tokens paid by the machine
- a total counter for the receipts C3: totals the number of stakes in the receipts bank
- a counter for the games played C4: totals the number of games played
- a total counter for the jackpots C5: totals the winnings obtained per jackpot
- a jackpot counter per total of token credits (only in certain countries: USA, etc).

Where the slot machine is equipped with a smart card reader 600, these six counters do not make it possible to distinguish whether the stakes or winnings have been effected by smart card or by token. This is why, in order to provide the casino with complete management of the slot machines which it has, nine counters are integrated into the smart card reader. Seven of them are logic counters located in EEPROM backed-up memory and two of them are electromechanical counters.

a) The logic counters are as follows:

- a total token and card stake counter
- a total token and card output counter
- a token receipts counter
- a total jackpot winnings counter
- a jackpot counter by totalling card and token credits (only in certain countries: e.g. USA)
- a card stake counter: this counter totals the stakes made by smart card
- a card output counter: this counter totals the returns of the winnings in the smart card.

The content of these seven counters is recovered by collecting the information in the memory of the smart card reader by means of a card authorized to effect a transfer, or by means of a network (if the slot machines are connected in a network). The content of these counters is then stored in the database of the operating software and then processed in order to supply the information necessary for managing the tokens and card credits staked and won.

b) The electromechanical counters are as follows:

- a card stake counter
- a card output counter.

These two counters are provided in a doublet in order to control, by direct reading, the integrity and management of the logic counters bearing the same names.

The other five (or six) electromechanical counters, the "images" of the logic counters, are those originally installed on the slot machine.

The set of counters in the slot machine is referenced 100 in FIG. 1.

The machine is, according to the invention, equipped with circuits for separating the credits issuing from the games by card or by tokens so as to obtain the credits in the form of tokens for a stake or game undertaken by token. The circuits also function to obtain the credits on the smart card in the reader before it is ejected or before a new card is inserted, for games undertaken by means of the card.

For this purpose, the electronics 700 and the reader have respectively a physical connection interface 110, 120, 130 and a logic connection interface 604 for scrutinizing the signals generated by the electronics of the machine, by connecting the signal outputs and/or inputs of the electronics of the machine to the reader/validator 600.

The connector 110 connects the outputs of the counters 100 to the control and management unit CPU 200 of the machine and to the control unit 601 of the reader via the logic interface 604.

The connector 120 connects the outputs of the control unit 200 of the machine to the control unit 601 of the reader via the interface 604, and connects the token comparator and the hopper to the control unit 601 of the reader via the interface 604.

Figure 2:
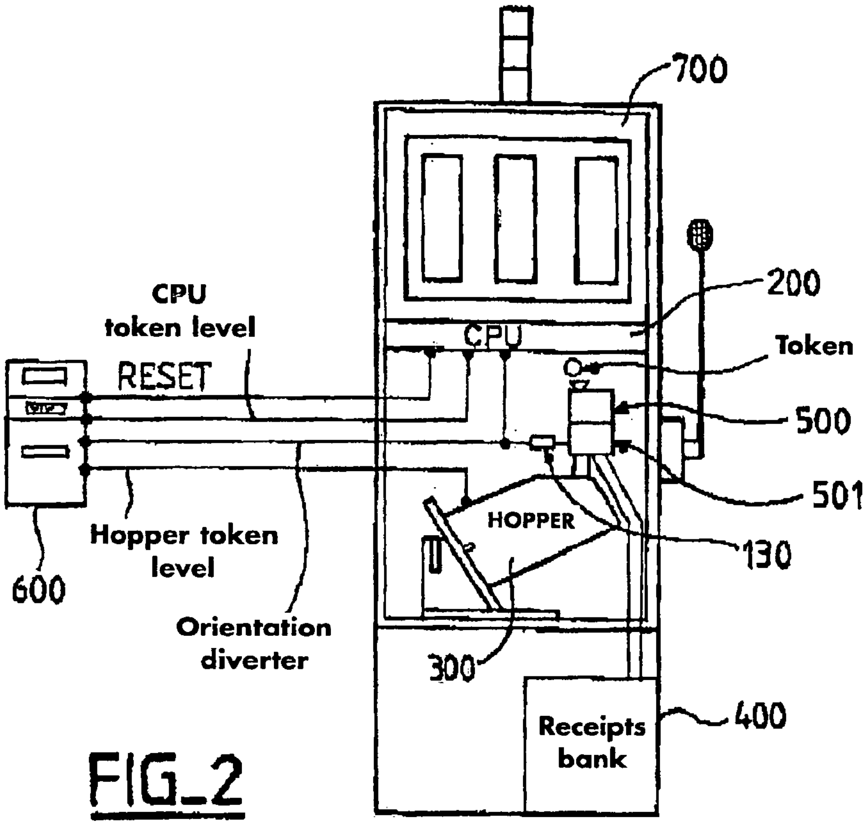
FIG. 2 depicts a diagram of a slot machine with the elements of the device allowing the direction, by the smart card reader, of the stakes made by a smart card to the hopper.

It will now be described how the card stakes are directed to the hopper of the slot machine. For this purpose reference can be made to the diagram in FIG. 2.

In a slot machine, each time a token or a smart card credit is staked, i.e. a bet is deposited by the player, it is directed either to the hopper or to the receipts bank. The choice of direction is made according to the token level in the hopper. This level is known by means of a Hopper Token Level signal from the hopper, which activates the mechanism for switching the tokens to the hopper or to the receipts bank:

if the hopper is not full, the stake is directed to the hopper, if the hopper is full, the stake is directed to the receipts bank.

A first problem resolved by the invention consists in making it possible for all the smart card stakes to be directed to the hopper of the slot machine, in order not to falsify the counter of the receipts bank.

To this end provision is made for scrutinizing or diverting the signals from the slot machine to the smart card reader 600 in order to return them to the CPU card 200 of the slot machine. This is accomplished by means of the physical connection interface and a diverter assembly comprising an electromagnet 130 and the mechanics 501 for switching the tokens to the hopper or receipts bank. These components are associated with the logic interface 604 placed in the reader in order to receive the decoding of the signals.

The reinitialization output "Reset" and "CPU Token Level" of the unit 200 are connected to the reader 600. The input "Orientation Diverter" of the unit 200 and the output "Orientation Diverter" of the diverter assembly are connected to the reader 600.

Each time a smart card is inserted, before sending stakes to the slot machine, the smart card reader will scrutinize whether the signal "orientation diverter" indicates direction of the stakes to the hopper or to the receipts bank:

if the diverter is directed to the hopper, the reader can send stakes to the slot machine since they will all be directed to the hopper, if the diverter is directed to the receipts bank:

the reader forces the signal "CPU token level" to the logic level corresponding to a hopper which is not full the reader then activates the general RESET of the slot machine so that the latter takes into account the change from full hopper to not-full hopper the reader can then send smart card credits to the slot machine since these will all be directed to the hopper.

Figure 3:
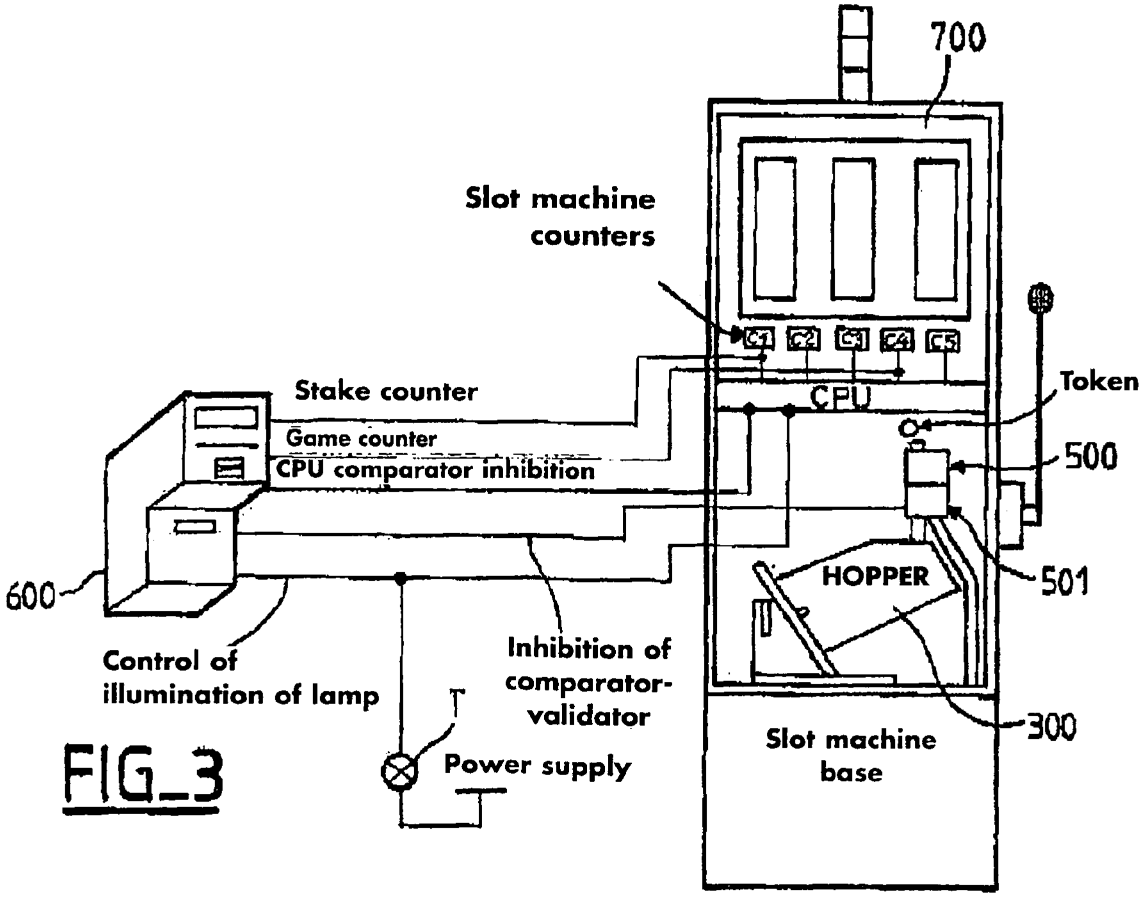
FIG. 3 depicts a diagram of a slot machine with the elements of the device allowing the detection of the current game.

It will now be described how the game in progress is detected, with reference to FIG. 3:

The stake-counting output C1 is connected to the unit 200 and also to the reader. The output counting the games C4 is connected to the unit 200 and also to the reader. With these two connections the reader can know the state of activity of the slot machine.

The current game on a slot machine is defined as any of the following states:

a game is currently being played with card credits or tokens, and is not yet finished, a partial stake (less than the maximum stake which the slot machine can accept) has been entered by card credits or tokens without the game being in progress, or card credits or tokens are stored in the credit counter of the slot machine without a partial stake being undertaken or a game being in progress.

The detection of the game in progress is carried out in order not to mix card credits and token credits. More particularly, after the insertion of a smart card in the reader, if a game by token is in progress, it is then possible to recover in the card the potential winnings from the game in progress or from the partial stake undertaken or the credits contained in the credit counter of the slot machine. Likewise, after the ejection of a smart card from the reader if a game is in progress by card, it is then possible to recover in tokens the potential winnings from the game in progress or from the partial stake undertaken or the credits contained in the credit counter of the slot machine.

A description of the operation in the different situations is set out below:

1) Insertion of the smart card in the reader a) The case of a game undertaken by token and not finished:

The reader scrutinizes the activity of the "inhibition" signal for the token comparator 500 issuing from the CPU unit 200 of the slot machine.

If this is active: this is because a game is in progress, the reader displays "game in progress" and ejects the smart card.

If this is inactive: this is because no game is in progress, the reader accepts the card insertion and displays the current cash contained in it.

b) The case of a partial stake:

The reader scrutinizes the counters C1 and C4 of the stakes and the games of the slot machine.

If the stake counter C1 has been incremented and not the game counter C4: this is because a partial stake has been effected, the reader displays "game in progress" and ejects the card.

If the stake counter C1 has not been incremented or has been incremented along with the game counter C4: this is because no partial stake has been effected, the reader accepts the insertion of the card and displays the current cash contained in it.

c) The case of the credit counter of the slot machine:

The reader scrutinizes the activity of the signal controlling the illumination of the lamp for the "MIN STAKE" button issuing from the CPU card of the slot machine.

If the signal is active (lamp illuminated): this is because credits are present in the credit counter of the slot machine, the reader displays "game in progress" and ejects the card.

If the signal is inactive (lamp extinguished): this is because the credit counter of the slot machine is empty, the reader accepts the card insertion and displays the current cash contained in it.

2) Ejection of the smart card from the reader a) The case of a game undertaken by card and not finished:

The reader scrutinizes the activity of the "inhibition" signal for the token comparator issuing from the CPU card of the slot machine.

If this is active: this is because a game is in progress, the reader displays "game in progress" and refuses to eject the smart card.

If this is inactive: this is because no game is in progress, the reader accepts the ejection of the card.

b) The case of a partial stake:

The reader scrutinizes the stake and game counters of the slot machine.

If the stake counter has been incremented and not the game counter: this is because a partial stake has been effected, the reader displays "game in progress" and refuses to eject the card.

If the stake counter has not been incremented or has been incremented along with the game counter, this is because no partial stake has been effected, and the reader accepts the ejection of the card.

c) The case of the credit counter of the slot machine:

The reader scrutinizes the activity of the signal controlling the illumination of the lamp for the "MIN STAKE" button issuing from the CPU card of the slot machine.

If this signal is active (lamp illuminated): this is because credits are present in the credit counter of the slot machine, the reader displays "game in progress" and refuses to eject the card.

If this signal is inactive (lamp extinguished): this is because the credit counter of the slot machine is empty, the reader accepts the ejection of the card.

The description which has just been given corresponds to an embodiment for which the means of separating the credits are based on parallel connections between the card reader and the slot machine. Naturally these connections could be replaced by a serial link. In this case, the information relating to the different inputs and/or outputs of the machine are exchanged in accordance with a serial communication protocol controlled by a program loaded for this purpose in the program memory (PROG) of the CPU electronics 200 of this machine.

The invention claimed is:

1. A protected slot machine comprising:

a token-type cash device and a smart card type cash device having a smart card reader, a central unit connected to said smart card reader for managing games played by token or smart card, and means for separating the credits issuing from games by card or by tokens, respectively, so as to identify such credits either in the form of tokens for a stake or game undertaken by token, or as credits on a smart card present in the reader, and for selectively inhibiting the ejection of a smart card or the insertion of a new card in accordance with such identification.

2. A protected slot machine according to claim 1, wherein said central unit has an associated receipt counter, and wherein the means for separating the credits include means for directing, by the smart card reader, said central unit to effectively treat stakes made by smart card as being deposited in a hopper of the slot machine, and thereby inhibit modification of the receipt counters.

3. A protected slot machine according to claim 2, wherein said central unit includes a CPU that outputs a token level and said slot machine includes an orientation diverter for selectively directing tokens to said hopper, and wherein the means for directing said central unit include a connection device for connecting a reset output of the central unit of the slot machine, a CPU token level output of the machine, an input controlling an orientation diverter of the machine, and a machine hopper token level output, to the smart card reader.

4. A protected slot machine according to claim 3, wherein said connection device comprises a serial connection and a communication protocol for exchanges between the central management unit of the machine and the smart card reader, and a program in a program memory of the central unit for controlling serial communications according to said protocol.

5. A protected slot machine according claim 2, wherein the means for separating the credits include means in the smart card reader for detecting information on games undertaken on stakes which are posted and on credit available for a player as soon as a smart card is inserted in said reader and until said smart card is ejected.

6. A protected slot machine according to claim 1, wherein the means for separating the credits include means in the smart card reader for detecting information on games undertaken, on stakes which are posted and on credit available for a player as soon as a smart card is inserted in said reader and until said smart card is ejected.

7. A protected slot machine according to claim 6, further comprising:

a stake counter, a counter for games which is connected to a central management unit of the machine, and wherein said detection means include a device for connecting output signals of these counters to the smart card reader on the insertion of a smart card in the reader or when there is a request to eject a card present in the reader.

8. A protected slot machine according to claim 7, further comprising a credit counter and a device for producing a signal indicating a minimum stake in said credit counter, wherein the detection means include a device for connecting said signal to the smart card reader on the insertion of a new card or when there is a request to eject a card.

9. A protected slot machine according to claim 7, wherein said connection device comprises a serial connection and a communication protocol for exchanges between the central management unit of the machine and the smart card reader, and a program in a program memory of the central unit for controlling serial communications according to said protocol.

10. A protected slot machine according to claim 6, wherein the central management unit delivers as an output a signal inhibiting the token-type cash device, and said detection means include a device for connecting the signal inhibiting the token-type cash device to the smart card reader on the insertion of a new card or when there is a request to eject a smart card.

11. A protected slot machine according to claim 10, wherein said connection device comprises a serial connection and a communication protocol for exchanges between the central management unit of the machine and the smart card reader, and a program in a program memory of the central unit for controlling serial communications according to said protocol.

12. A protected slot machine according to claim 10, further comprising a credit counter and a device for producing a signal indicating a minimum stake in said credit counter, wherein the detection means include a device for connecting said signal to the smart card reader on the insertion of a new card or when there is a request to eject a card.

13. A protected slot machine according to claim 6, further comprising a credit counter and a device for producing a signal indicating a minimum stake in said credit counter, wherein the detection means include a device for connecting said signal to the smart card reader on the insertion of a new card or when there is a request to eject a card.

14. A protected slot machine according to claim 6, wherein said separating means inhibits the ejection of a smart card or the insertion of a new card when any of the following conditions are present:

i) a game is currently in progress;

ii) a stake is posted;

iii) a credit is available for the player.

15. A protected slot machine comprising:

a smart card type cash device having a smart card reader, a central unit for managing games played by token or smart card; and means for separating credits issuing from games by card or by tokens, respectively, so as to identify such credits either in the form of tokens for a stake or game undertaken by token, or as credits on a smart card present in the reader, and for selectively inhibiting the ejection of a smart card or the insertion of a new card in accordance with such identification.

16. A protected slot machine according to claim 15, wherein said separating means inhibits the ejection of a smart card or the insertion of a new card when any of the following conditions are present:

i) a game is currently in progress;

ii) a stake is posted;

iii) a credit is available for the player.

17. A smart card reader unit for use with a protected slot machine comprising:

a smart card reader, and means for separating the credits issuing from games by card or by tokens, respectively, so as to identify credits either in the form of tokens for a stake or game undertaken by token, or as credits on a smart card present in the reader, and for selectively inhibiting the ejection of smart card or the insertion of a new card in accordance with such identification.

18. A smart card reader according claim 17, wherein the means for separating the credits include means connected to the slot machine for detecting, by the smart card reader, information on the games undertaken, on the stakes and on the credit available for a player as soon as a smart card is inserted in said reader until said smart card is ejected.

19. A protected slot machine according to claim 17, wherein said separating means inhibits the ejection of a smart card or the insertion of a new card when any of the following conditions are present:

i) a game is currently in progress;

ii) a stake is posted;

iii) a credit is available for the player.

20. A protected slot machine, comprising:

a token-type cash device and a smart card type cash device having a smart card reader;

a central unit connected to the smart card reader and having an associated receipt counter, for managing games played by token or smart card; and means in said smart card reader for directing said central unit to effectively treat stakes made by smart card as being deposited in a hopper of the slot machine, and thereby inhibit modification of the receipt counter.

21. A protected slot machine according to claim 20, wherein said central unit includes a CPU that outputs a token level and said slot machine includes an orientation diverter for selectively directing tokens to said hopper, and wherein the means for directing said central unit include a connection device for connecting a reset output of the central unit of the slot machine, a CPU token level output of the machine, an input controlling an orientation diverter of the machine, and a machine hopper token level output, to the smart card reader.

22. A protected slot machine according to claim 20, wherein said means for directing includes a detector for determining whether said central unit indicates that said hopper is in a full state, and means responsive to said detector for sending a signal to said central unit that causes said central unit to remove the indication that the hopper is in a full state.

23. The protected slot machine of claim 22, wherein said means responsive to said detector generates a first signal that indicates the hopper is not in a full state, and a second signal to reset said central unit to cause said central unit to change the indicated state of the hopper.

24. A protected slot machine, comprising:

a token-type cash device and a smart card type cash device having a smart card reader, a central unit for managing games played by token or smart card, which generates an output signal inhibiting the token-type cash device; and means for separating credits issuing from games by card or by tokens, respectively, so as to identify such credits either in the form of tokens for a stake or a game undertaken by token, or as credits on a smart card present in the reader, including means for connecting the signal inhibiting the token-type cash device to the smart card reader on the insertion of a new card or when there is a request to eject a smart card.

25. A protected slot machine according to claim 24, wherein the means for separating the credits include means in the smart card reader for detecting information on games undertaken, on stakes which are posted and on credit available for a player as soon as a smart card is inserted in said reader and until said smart card is ejected.

26. A protected slot machine according to claim 25, further comprising:

a stake counter, a counter for games which is connected to a central management unit of the machine, and wherein said detection means include a device for connecting output signals of these counters to the smart card reader on the insertion of a smart card in the reader or when there is a request to eject a card present in the reader.

27. A protected slot machine according to claim 24, further comprising a credit counter and a device for producing a signal indicating a minimum stake in said credit counter, wherein the detection means include a device for connecting said signal to the smart card reader on the insertion of a new card or when there is a request to eject a card.

* * * * *